Patented June 13, 1950

2,511,198

UNITED STATES PATENT OFFICE 2,511,198

PREPARATION OF CONCENTRATED FORMIC ACID

Karl H. Engel, Teaneck, N. J., assignor to Allied Chemical & Dye Corporation, New York, N. Y., a corporation of New York No Drawing. Application January 2, 1948, Serial No. 377

5 Claims. (Cl. 260—542)

This invention relates to the production of concentrated formic acid by a process involving the formation of azeotropes of formic acid with various agents.

Concentrated formic acid has been prepared commercially by various processes. Thus, it has been known to distill sodium formate and concentrated sulfuric acid at reduced pressures to obtain concentrated formic acid. However, various difficulties of such processes, including the decomposition of formic acid at or near its boiling point, especially in the presence of sulfuric acid, in conjunction with poor heat transfer conditions during distillation owing to the presence of solid sodium sulfate, are sought to be avoided by the process of my invention.

The chief object of my invention is to provide processes for the preparation of concentrated formic acid from dilute formic acid or a soluble formate without the disadvantages noted above in prior processes.

Other objects and advantages will be apparent from the following detailed description of my invention.

The broader aspects of the invention comprise forming an azeotropic mixture of formic acid and certain herein described tertiary amines, converting the amine of such mixture to the corresponding sulfate, and recovering the thus liberated formic acid in concentrated form.

In the general practice of my invention, a tertiary amine capable of forming an azeotropic mixture with formic acid is combined with the formic acid content of aqueous solutions, initially containing formic acid as such or soluble salts thereof, and the resulting mixture is distilled preferably at subatmospheric pressure under conditions to separate out the water as distillate and leave a dehydrated constant-boiling or azeotropic mixture of formic-acid and amine as still residue. Concentrated sulfuric acid is then added to this azeotropic mixture to convert the amine to the sulfate thereof, and the resulting mixture is distilled at subatmospheric pressure to obtain as distillate a concentrated formic acid, leaving the amine sulfate salt as still residue.

In one satisfactory embodiment of my invention, an alkali metal, ammonium or alkaline earth metal formate, e. g. sodium formate, is reacted with sulfuric acid to produce dilute formic acid and sodium sulfate, the bulk of which comes down as a precipitate. This precipitated sulfate is separated from the dilute formic acid liquor either by distillation or filtration, and the distillate or filtrate is then subjected to the above method to produce concentrated formic acid, i. e. the dilute formic acid is mixed with a tertiary amine capable of forming an azeotropic mixture with the formic acid present, the resulting mixture is dehydrated, concentrated sulfuric acid is added to the dehydrated mixture, and the resulting mixture is distilled at subatmospheric pressure to collect concentrated formic acid as distillate.

In practice, there is added to a solution of one of the above-mentioned formates, e. g. sodium formate, an amount of sulfuric acid sufficient to liberate all the formic acid present in the sodium formate. Prior to incorporation of sulfuric acid, water is usually added either in sufficiently large quantities to keep the sodium sulfate subsequently formed in the reaction in solution, or in lesser quantities to allow precipitation of the sodium sulfate and maintain it in suspension to facilitate its removal. Distillation may be employed to separate sodium sulfate, whether in solution or suspension, from the formic acid and other ingredients while filtration may be alternatively utilized for this purpose when the sodium sulfate is in suspension in the form of a precipitate. In preferred practice, prior to incorporation of sulfuric acid, limited proportions of water are added, usually in amounts sufficient to make the total quantity of water in the initial solution about equal in weight to the amount of formate present. Under these circumstances, a precipitate of sodium sulfate is formed in the reaction and is kept in suspension thus facilitating separation of the formic acid therefrom either by distillation or filtration. Although smaller quantities of water may be incorporated into the formate solution than that indicated directly above, the use of much smaller quantities of water than this results in a heavy precipitate which renders removal of dilute formic acid therefrom either by distillation or filtration more difficult. A portion of the total quantity of water employed may be incorporated in the sulfuric acid used for liberating the formic acid.

The tertiary amine used to form an azeotrope with the formic acid liberated from the formate may be incorporated with the sodium formate starting solution separately or simultaneously with addition of the sulfuric acid. The amine is preferably utilized in quantity at least sufficient to form an azeotrope with the formic acid constituent of the starting material. Use of an excess of tertiary amine above the correct azeotropic ratio is of no particular value, since such excess will distill over with the water during removal thereof from the azeotropic formic acid-tertiary amine mixture in a later step of my process. As a preferred alternative to addition to the aqueous formate solution of tertiary amine and sulfuric acid as individual ingredients, it has been found possible to incorporate the amine and the sulfate radical as tertiary amine sulfate. Whether the tertiary amine and the sulfate radical are incorporated as amine sulfate, or as tertiary amine and sulfuric acid separately or simultaneously introduced, the sulfate radical of the sulfuric acid or of the amine sulfate combines with the sodium of the sodium formate to produce sodium sulfate in solution or as a precipitate and liberate formic acid.

Suitable tertiary amines for use in my process are those which form azeotropic mixtures with formic acid. Such compounds include trialkyl amines containing not more than ten carbon atoms, and pyridine and its homologs having the general formula:

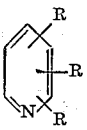

where R represents a member of the class consisting of methyl and ethyl groups, and the number of such R substituents ranges from 0 to 3, the total number of carbon atoms in all of said substituents not exceeding 3. The heterocyclic nitrogen compounds represented by the above formula are usually present in coal tar and are referred to as "pyridine bases" throughout the specification and claims. All of the above amines have boiling points not exceeding 185° C., but I prefer to employ those whose boiling points do not exceed about 175° C. Representative amines of the class employed are trimethyl, dimethylethyl, triethyl, diethyl-propyl and tripropyl amine, pyridine, the various isomeric picolines, e. g. 2-picoline, 3-picoline and 4-picoline, the various isomeric lutidines, e. g. 2,4-, 2,5- and 2,6-lutidine, ethyl pryidines and the various isomeric collidines, e. g. 4-ethyl-2-methylpyridine, 3-ethyl-4-methylpyridine and 2,4,6-trimethylpyridine. I prefer to employ the heterocyclic pyridine bases as the tertiary amine.

Mixtures of any of these various amines may be used instead of the pure compounds. Thus, for example, crude commercial mixtures of coal tar origin boiling within the range of say 125° C. to 165° C. are especially adapted to serve as a source of tertiary amine for my process. Such a mixture may comprise 2,6-lutidine, 3-picoline and 4-picoline, along with varying amounts of other substances such as 2-picoline boiling at 129° C. and 2,3-, 2,4-, and 2,5-lutidines boiling within the range of about 150°-165° C. at 760 mm. pressure. However, typical crude commercial mixtures of this general type which contain predominantly 2,6-lutidine, 3-picoline, and 4-picoline boil substantially within the range of 140° to 145° C. Other mixtures of coal tar origin such as that of 2,3-, 2,4-, and 2,5-lutidines boiling within the range of about 150° to 165° C., or a mixture of isomeric collidines with the 2,4,6-collidine predominating and boiling within the range of about 165° to 175° C. may also be employed. Mixtures of coal tar origin having higher boiling ranges than any of those mentioned contain primary amines such as aniline and toluidines which are unsuitable.

Although I prefer to incorporate the tertiary amine or mixtures thereof with the original formate solution before liberation of formic acid therefrom, said amine or amines may alternatively be added to the mixture of sulfate and dilute formic acid after the reaction of the sulfuric acid and formate is complete, or to the dilute formic acid solution after separation of the sulfate therefrom.

In the preferred embodiment of the invention, after the reaction of formate with sulfuric acid to precipitate sulfate, the latter is separated from the aqueous liquor containing formic acid either by distillation or filtration. If distillation is employed, separation of sodium sulfate may be effected by steam distilling in the presence of such adequate amounts of water that the sodium sulfate and the bulk of the water remain in the still while the formic acid-amine azeotrope and some water distill off and are collected as condensate. Such distillation may take place at atmospheric pressure although subatmospheric pressures may also be used. When filtration is employed as a means of removing the sulfate precipitate, only an amount of water sufficient to precipitate the bulk of the sulfate while providing a solvent medium for the tertiary amine-formic acid azeotrope, should be utilized. The distillate or filtrate will contain dilute aqueous formic acid with or without the tertiary amine depending on whether the latter was incorporated in the original sulfuric acid-formate solution.

It is to be understood, of course, that if dilute aqueous formic acid is available as a raw material, the latter may be used as a starting material of my process in place of the discussed formate solutions thus eliminating the necessity for the above sulfuric acid treatment to produce free formic acid followed by removal of sulfate.

Dehydration of the azeotropic mixture of formic acid and tertiary amine is a fractional distillation operation and is preferably carried out at subatmospheric pressure sufficiently low to maintain the liquid charge in the still at temperature not substantially in excess of the order of 110°–120° C., and preferably not substantially in excess of 100° C. As a matter of practice, such temperatures usually range from 85° to 100° C. In the initial phases of distillation all the water and any excess of amine above the correct azeotropic ratio of formic acid-amine distills off, at which time the temperature of the still charge rises to constancy. The distillation is terminated when the boiling point of the liquor in the still reaches constancy, the specific maximum temperature in each instance depending upon the boiling point of the azeotrope of formic acid and the particular amine being used. Boiling points of azeotropic mixtures of formic acid and representative tertiary amines are hereafter stated.

The sulfuric acid which is added to the dehydrated azeotropic mixture of formic acid and tertiary amine is preferably as concentrated as possible but may have strength as low as 93% $H_2SO_4$. The term "concentrated sulfuric acid" as employed in the claims is intended to indicate an $H_2SO_4$ strength of 93% $H_2SO_4$ or more. The sulfuric acid thus incorporated reacts with the amine of the azeotropic mixture to form the amine sulfate and liberate free formic acid. Regardless of the $H_2SO_4$ strength of the particular sulfuric acid used, the quantity of the latter employed in practice is such as to supply preferably at least a stoichiometric quantity of $H_2SO_4$ on the basis of the amine present. If a full stoichiometric amount of $H_2SO_4$ is not applied, the distillate obtained during subsequent distillation to recover formic acid will consist of a mixture of free formic acid and formic acid-amine azeotrope, which is undesirable, instead of free concentrated formic acid.

Distillation of the resulting mixture of amine sulfate and formic acid is carried out at subatmospheric pressure sufficiently low to maintain the liquid charge in the still at temperature not substantially in excess of 120° C., and preferably not substantially in excess of 110° C. Concentrated formic acid is collected as distillate leaving amine sulfate salt as still residue.

Residual sulfates of the tertiary amines, which remain liquid during the distillation of concentrated formic acid from the mixture of amine sulfate and formic acid, may be recycled to liberate additional formic acid from the above formates. The solution of amine-sulfate is then applied to a quantity of formate, along with whatever amounts of fresh sulfuric acid and/or amine may be required to react with all the formate present to produce formic acid and enable the latter to combine with the tertiary amine or amines present in correct azeotropic ratio.

However, if desired, the tertiary amine in the still residue may be recovered from its sulfate by neutralizing the residual sulfate of said amine with an alkali, e. g. sodium hydroxide or milk of lime. Ammonia may be used for this purpose when the amine is one of the above pyridine bases. The liberated amine may be recovered in a concentrated aqueous distillate by distilling the reaction mixture with or without the presence of steam. Liberated amines with limited water solubility, particularly the above heterocyclic pyridine bases, have negligibly small solubilities in the highly concentrated solution of alkali sulfate. When using amines of this type, the amine may thus be allowed to separate from the aqueous alkali sulfate in a supernatant layer containing small proportions of dissolved water. The layer of amine is then drawn off and dried in any suitable manner.

Yields and recoveries of products can be made almost quantitative by recycling aqueous distillates that contain any excess of reagents, either tertiary amine or free formic acid, which may have been present in the reaction mixture in excess of the exact azeotropic ratios. Non-volatile impurities which may be present in the crude reagents or acquired during an operating cycle tend to accumulate in the formic acid-amine azeotropic mixture left as still residue after the dehydration operation. Disposal of such non-volatile impurities may be effected by an occasional complete distillation of this azeotropic mixture at subatmospheric pressure.

All distillations are carried out in equipment capable of resisting corrosion by formic acid, tertiary amine, and sulfuric acid. Thus, dehydration of the dilute formic acid-tertiary amine mixture is carried out in stainless steel equipment, either copper or iron stills being unsuited for this purpose. The still used for distillation of formic acid from the mixture of formic acid-amine azeotrope and concentrated sulfuric acid is constructed of enamel-lined or glass-lined steel.

The following list of approximate compositions and boiling points of various azeotropic mixtures of formic acid and tertiary amines may serve as a guide in selecting suitable operating conditions for my process:

| Tertiary Amine | Boiling Point of Azeotrope, °C. | Pressure, mm. Hg | Composition Ratio by weight, Formic Acid to Tertiary Amine |
|---|---|---|---|
| Triethyl amine | 120.0 | 44 | 47.2/52.8 |
| Pyridine | 103.0 | 137 | 63.3/36.7 |
| 2-Picoline | 80.0 | 34 | 56.7/43.3 |
| 3-Picoline | 81.0 | 34 | 50.3/49.7 |
| 4-Picoline | 84.5 | 34 | 50.7/49.3 |
| 2,4-Lutidine | 94.0 | 37 | 47.5/52.5 |
| 2,6-Lutidine | 85.5 | 34 | 53.2/46.8 |
| 2,4,6-Collidine | 93.0 | 27 | 47.4/52.6 |

The following detailed examples serve to illustrate my invention; all quantities being designated in parts by weight:

*Example 1.*—A solution containing 140 parts sodium formate in 140 parts water is held in an agitated vessel of stainless steel construction. A mixture containing 80 parts pyridine and 100 parts sulfuric acid of 98.0% strength is gradually added to the sodium formate solution. A heavy precipitate of sodium sulfate results and the solution is finally buffered by addition of a slight excess of sodium formate over the exact stoichiometric proportion, metal corrosion being held to a minimum by avoiding the presence of free sulfuric acid. The mixture is subjected to an ordinary distillation first at a pressure of about 300 mm. mercury, removing water, pyridine and formic acid at a vapor temperature of 70° to 80° C. Sodium sulfate remaining as a still residue is completely dehydrated by reducing the distillation pressure to about 30 mm. at the end.

The distillate consisting of pyridine, formic acid and water is submitted to a fractional distillation at about 137 mm. mercury. The initial distillate, boiling at 53° to 59° C., consists of water and pyridine present in excess of the constant boiling ratio of pyridine and formic acid in the azeotrope. After practically complete removal of water the boiling point of the remaining mixture rises to constancy at about 103° C. Fractional distillation is interrupted at this point. The still residue consists of the azeotrope containing 63.3 parts formic acid to 36.7 parts pyridine. 250 parts azeotrope, containing 1.17 molecular equivalents of pyridine and 115 parts sulfuric acid, 98%, are mixed gradually, applying a little outside cooling to maintain a reaction temperature not above 70° C. The charge is distilled at reduced pressure beginning at about 40 mm. but lowering the pressure gradually to 10 mm. Vapors of formic acid distilling at about 35° to 68° C. are condensed in an efficient condenser. The still temperature rises gradually from about 38° to 120° C. at the end. 143 parts of a water-white distillate containing 97.2% formic acid are obtained. Residual pyridine sulfate begins to crystallize at about 97° C. However, addition of a small quantity of water serves to keep the mass liquid. The pyridine sulfate may be recycled to liberate additional formic acid from sodium formate.

*Example 2.*—A solution containing 210 parts sodium formate and 200 parts water is mixed with a solution containing 80 parts pyridine, 147 parts sulfuric acid of 98.0% strength and 20 parts water. A heavy precipitate of sodium sulfate results. After continued agitation for about one hour, at a temperature of about 50° C., the crystals assume an easily filtrable size. The charge is cooled to about 35° C. and sodium sulfate crystals are removed by filtration. These crystals are washed with a little water to complete extraction of the pyridine-formic acid mixture. The filtrate contains a small proportion of the total sodium sulfate produced, its solubility in the presence of pyridine being appreciably smaller than in pure water or water and formic acid mixtures. The filtrate is subjected to fractional distillation at reduced pressures, removing water containing only a trace of pyridine. An additional small quantity of sodium sulfate precipitates during dehydration. This may be separated by decantation or filtration. Alternatively, the complete still residue containing the sulfate may be admixed with at least a stoichiometric proportion of $H_2SO_4$ on the basis of the pyridine present, and the mixture submitted to distillation at reduced pressure as described in Example 1. The proportion of sodium sulfate suspended in the liquid reaction mixture, in this case, is too small to interfere with efficient heat transfer during distillation. Concentrated formic acid is collected as distillate leaving pyridine sulfate as still residue.

*Example 3.*—550 parts formic acid, of approximately 50% concentration, are mixed with 250 parts of a commercial mixture of heterocyclic pyridine bases of coal tar origin having a boiling range of 142°–145° C. and containing the following components: 2-picoline, 3.5%; 3-picoline, 33.5%; 4-picoline, 36.0%; and 2,6-lutidine, 27%. The mixture is fractionally distilled in a fractionating column of simple construction at reduced pressure between about 40 and 65 mm. Hg, removing water at a vapor temperature of 40°–45° C. The water distillate contains a small percentage of free heterocyclic pyridine bases. When removal of the water is complete, the vapor temperature rises to 80.5° C. at 38 mm. Hg pressure. Fractionation is discontinued and dehydrated still residue withdrawn. The material contains 49% base and 51% formic acid. 500 parts of the constant boiling azeotropic mixture thus prepared are mixed with 265 parts sulfuric acid, 98%, the mixture being agitated and cooled during this addition to maintain a temperature of about 65° C. in the charge. The mixture is distilled at a pressure of 10 to 12 mm. Hg, removing the liberated formic acid at a vapor temperature of 35°–70° C. The temperature of the still residue consisting of pyridine base sulfates rises to 107° C. at the end. A slight decomposition occurs at the higher temperature. Formic acid is condensed in an efficient condenser, 249 parts being obtained. The material is water-white and contains 96.2% formic acid. The still residue contains a small additional quantity of formic acid.

The pyridine base sulfates in the still residue are utilized to generate formic acid by adding them gradually, with agitation, while warm, to a liquor containing 360 parts sodium formate and 250 parts water. The mass is agitated, and cooled to room temperature. Generated sodium sulfate under these conditions is nearly completely precipitated in readily filtrable crystals. The reaction mixture is filtered by suction, a compact filter cake of sodium sulfate being obtained. This is washed with a little water at about 30° C., washings being held separately to be reused as a source of water in a subsequent batch. The filtrate containing pyridine bases, formic acid, water, and a small percentage of sodium sulfate is subjected to dehydration by fractional distillation. Concentrated sulfuric acid is then added to the still residue containing the pyridine bases and formic acid and the resulting mixture is distilled at subatmospheric pressures to obtain concentrated formic acid as distillate.

*Example 4.*—About 2537 parts of an azeotropic mixture containing 52% formic acid, or 1319 parts anhydrous acid, and 47% of a mixture of 4-picoline and 2,6-lutidine, or 1183 parts, remaining 1% being absorbed moisture, are mixed with 1275 parts concentrated sulfuric acid of 95% strength, and the resulting mixture cooled slightly to maintain the temperature of the mixture not over 80° C. Said mixture is then distilled holding the pressure between 22 and 10 mm. Hg, vapor temperature being between 45° and 70° C., and still charge temperature between 51° and 110° C. at the end. 1274 parts formic acid of 93.6% strength, representing 1180 grams of anhydrous material, are recovered as water-white distillate. The recovery represents about 90% of the available formic acid. The warm pyridine base sulfate mixture remaining as distillation residue is poured into 1000 parts of water and neutralized with concentrated ammonia solution of 28% strength, until the aqueous solution changes Brilliant Yellow Indicator Paper to orange, 1650 parts of ammonia solution being required. The reaction mixture is cooled and the ammonia solution conducted below the liquid level to avoid loss of vapors. The ammonium sulfate formed is completely soluble at the end. The liberated bases, 4-picoline and 2,6-lutidine, collect sharply as an upper layer which is separated while warm. Steam distillation of the ammonium sulfate solution gives only 15 parts of bases, their solubility in the highly concentrated ammonium sulfate solution being very small. The liberated bases are washed with a little saturated sodium chloride solution to remove dissolved excess ammonia and adhering sulfate solution. They are then dried with sodium hydroxide chips, a total of 1139 parts being obtained.

*Example 5.*—About 132 parts dilute formic acid of approximately 26.0% concentration are mixed with 72 parts triethyl amine. The resulting mixture is fractionally distilled at subatmospheric pressure between about 295 and 300 mm. Hg, removing water and excess triethyl amine at a still head vapor temperature of 52° to 55° C., the still charge temperature ranging between 75° and 100° C. After removal of water, fractionation is discontinued and dehydrated still residue containing 26.4 parts triethyl amine and 23.6 parts formic acid is withdrawn. To the latter azeotropic mixture are added 26.9 parts sulfuric acid of 95.0 to 96.0% strength while maintaining a temperature of less than 40° C. in the charge by cooling with ice. The resulting mixture is distilled at a pressure of 13 to 15 mm. Hg, removing liberated formic acid at a still head vapor temperature of 19° to 27° C., the temperature of the still charge containing triethyl amine sulfate ranging from 46° to 92° C. at the end. The formic acid distillate is condensed in an efficient condenser, 23.8 parts of a water-white material containing 89.0–91.0% formic acid being obtained. This recovery represents about 69.0% of the available formic acid.

The triethyl amine sulfate mixture remaining as still residue is then neutralized with 19.2 parts calcium hydroxide in 150 parts water and the free triethyl amine is then separated from the resulting precipitate of calcium sulfate by decantation. The triethyl amine is then reused without further purification.

I claim:
1. The process of preparing concentrated formic acid comprising subjecting dilute formic acid to distillation, in the presence of a tertiary amine selected from the group consisting of trialkyl amines containing not more than ten carbon atoms and amines of the general formula.

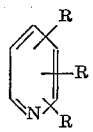

where R represents an alkyl group containing not more than 2 carbon atoms, and the number of such R substituents ranges from 0 to 3, the total number of carbon atoms in all of said substituents not exceeding 3, said amine having a boiling point not substantially in excess of 175° C., and being present in amount sufficient to form an azeotrope with the formic acid present, at subatmospheric pressure sufficiently low to maintain the liquid charge in the still at a boiling temperature not substantially in excess of 110° C., to thereby distill off water and any amine present in excess of the amount required to form an azeotrope of said amine with formic acid, subjecting the still residue containing an azeotrope of formic acid and said amine to distillation, in the presence of at least a stoichiometric amount of $H_2SO_4$ on the basis of the amine present, at subatmospheric pressure sufficiently low to maintain the liquid charge in the still at a boiling temperature not substantially in excess of 110° C., and collecting concentrated formic acid as distillate.

2. The process of preparing concentrated formic acid comprising reacting a soluble formate with sulfuric acid to liberate formic acid, separating the sulfate formed from the resulting liquor containing liberated formic acid, subjecting said liquor to distillation, in the presence of a tertiary amine selected from the group consisting of trialkyl amines containing not more than ten carbon atoms and amines of the general formula:

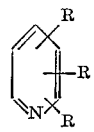

where R represents an alkyl group containing not more than 2 carbon atoms, and the number of such R substituents ranges from 0 to 3, the total number of carbon atoms in all of said substituents not exceeding 3, said amine having a boiling point not substantially in excess of 175° C., and being present in amount sufficient to form an azeotrope with the formic acid present, at subatmospheric pressure sufficiently low to maintain the liquid charge in the still at a boiling temperature not subtantially in excess of 110° C. and under conditions to distill off water and any amine present in excess of the amount required to form an azeotrope of said amine with formic acid, subjecting the still residue containing an azeotrope of formic acid and said amine to distillation, in the presence of at least a stoichiometric amount of $H_2SO_4$ on the basis of the amine present, at subatmospheric pressure sufficiently low to maintain the liquid charge in the still at a boiling temperature not substantially in excess of 110° C., collecting concentrated formic acid as distillate, and leaving the sulfate of said amine as still residue.

3. The process of preparing concentrated formic acid which comprises subjecting a solution of formic acid and water to distillation, in the presence of an amine of the general formula:

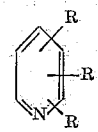

where R represents an alkyl group containing not more than 2 carbon atoms, and the number of such R substituents ranges from 0 to 3, the total number of carbon atoms in all of said substituents not exceeding 3, said amine having a boiling point not substantially in excess of 175° C., and being present in amount sufficient to form an azeotrope with the formic acid present, at subatmospheric pressure sufficiently low to maintain the liquid charge in the still at a boiling temperature not substantially in excess of 110° C., to thereby distill off water and any amine present in excess of the amount required to form an azeotrope of said amine with formic acid, subjecting the still residue containing an azeotrope of formic acid and said amine to distillation, in the presence of at least a stoichiometric amount of $H_2SO_4$ on the basis of the amine present, at subatmospheric pressure sufficiently low to maintain the liquid charge in the still at a boiling temperature not substantially in excess of 110° C., and collecting concentrated formic acid as distillate.

4. The process of preparing concentrated formic acid which comprises reacting an aqueous solution of sodium formate with sulfuric acid in the presence of an amount of pyridine at least sufficient to form an azeotrope with the formic acid liberated by the reaction, separating the sodium sulfate formed from the resulting liquor containing formic acid, water and pyridine by distillation at subatmospheric pressures under conditions to collect said liquor as distillate, subjecting said liquor to fractional distillation at subatmospheric pressure sufficiently low to maintain the liquid charge in the still at a boiling temperature not substantially in excess of 100° C., to distill off water and any pyridine in excess of that required to produce the correct azeotropic ratio of pyridine to the formic acid present, incorporating with the still residue containing the azeotrope of pyridine and formic acid at least a stoichiometric amount of $H_2SO_4$ on the basis of the pyridine present, distilling such mixture at subatmospheric pressure sufficiently low to maintain the liquid charge in the still at a boiling temperature not substantially in excess of 110° C., collecting the overhead vapors in the form of concentrated formic acid, and leaving a solution of pyridine sulfate as still residue.

5. The process of preparing concentrated formic acid which comprises incorporating in a dilute formic acid solution a mixture of pyridine bases of coal tar origin and boiling within the range of about 140° to 145° C. and containing predominantly 3-picoline, 4-picoline and 2,6-lutidine, subjecting the resulting mixture to distillation at subatmospheric pressure sufficiently low to maintain the liquid charge in the still at a boiling temperature not substantially in excess of 100° C., under conditions to distill off water and any small amount of said pyridine bases in excess of the amount required to form an azeotrope of said bases with the formic acid present, incorporating in the still residue containing an azeotrope of formic acid and said bases at least a stoichiometric amount of $H_2SO_4$ on the basis of the total of said pyridine bases present, distilling the resulting mixture at subatmospheric pressure sufficiently low to maintain the liquid charge in the still at a boiling temperature not substantially in excess of 110° C., and collecting concentrated formic acid as distillate and leaving the sulfates of said bases as still residue.

KARL H. ENGEL.

REFERENCES CITED

The following references are of record in the file of this patent:

UNITED STATES PATENTS

| Number | Name | Date |
| --- | --- | --- |
| 1,843,434 | Weitzel | Feb. 2, 1932 |
| 1,919,850 | Luscher | July 25, 1933 |
| 2,034,332 | Dragendorff | Mar. 17, 1936 |
| 2,357,412 | Levesque | Sept. 5, 1944 |
| 2,375,015 | Marple et al. | May 1, 1945 |
| 2,375,016 | Marple et al. | May 1, 1945 |